United States Patent
Millar

(10) Patent No.: US 10,425,692 B2
(45) Date of Patent: Sep. 24, 2019

(54) METHOD AND DEVICE FOR FIELD TESTING USER INTERFACES BASED ON A FLEXIBLE HIERARCHY STRUCTURE

(71) Applicant: Synamedia Limited, Middlesex (GB)

(72) Inventor: Keith Millar, Haywards Heath (GB)

(73) Assignee: SYNAMEDIA LIMITED, Middlesex (GB)

( * ) Notice: Subject to any disclaimer, the term of this patent is extended or adjusted under 35 U.S.C. 154(b) by 0 days.

(21) Appl. No.: 15/366,536

(22) Filed: Dec. 1, 2016

(65) Prior Publication Data
US 2018/0160176 A1    Jun. 7, 2018

(51) Int. Cl.
| | |
|---|---|
| *H04N 5/445* | (2011.01) |
| *H04N 21/466* | (2011.01) |
| *H04N 21/472* | (2011.01) |
| *H04N 21/482* | (2011.01) |
| *H04N 21/845* | (2011.01) |
| *H04N 21/45* | (2011.01) |
| *H04N 21/422* | (2011.01) |

(52) U.S. Cl.
CPC ..... *H04N 21/4665* (2013.01); *H04N 21/4532* (2013.01); *H04N 21/47202* (2013.01); *H04N 21/4821* (2013.01); *H04N 21/8455* (2013.01); *H04N 21/42209* (2013.01)

(58) Field of Classification Search
CPC ....... H04N 21/23109; H04N 21/42209; H04N 21/4665; H04N 21/4532; H04N 21/4821; H04N 21/8455
See application file for complete search history.

(56) References Cited

U.S. PATENT DOCUMENTS

| | | | |
|---|---|---|---|
| 7,778,899 B2 * | 8/2010 | Scumniotales | ........ G06Q 10/10 705/35 |
| 8,225,354 B2 | 7/2012 | Acton et al. | |
| 8,904,427 B2 * | 12/2014 | Millar | ...................... H04N 5/76 725/32 |
| 8,935,247 B1 | 1/2015 | Tholome et al. | |

(Continued)

OTHER PUBLICATIONS

Hiding Sub-trees on Hierarchy Diagrams, IBM Knowledge Center, available at http://www.ibm.com/support/knowledgecenter/SS6RBX_11.4.3/com.ibm.sa.help.doc/topics/t_Hiding_Subtrees_Hierarchy_Diags.html, last visited Sep. 22, 2016.

*Primary Examiner* — Hunter B Lonsberry
*Assistant Examiner* — Sahar Aqil Riaz
(74) *Attorney, Agent, or Firm* — Fernando & Partners, LLP; Ying Li

(57) ABSTRACT

In one implementation, a method performed by a content server with one or more processors and non-transitory memory includes: receiving a first view request from a first client device; determining a first view group associated with the first client device in response to receiving the first view request; identifying a first view hierarchy based on the first view group, where the first view hierarchy includes a first plurality of pointers to a first plurality of content sub-tree hierarchies associated with content items and the first view hierarchy also includes a first order schema; obtaining the first plurality of content sub-tree hierarchies based on the first plurality of pointers; and transmitting display data associated with a first user interface to the first client device based on the first order schema and the first plurality of content sub-tree hierarchies.

20 Claims, 10 Drawing Sheets

(56) References Cited

U.S. PATENT DOCUMENTS

| | | | |
|---|---|---|---|
| 9,280,452 B1* | 3/2016 | Mahadevan | G06F 11/3684 |
| 9,338,487 B2* | 5/2016 | Perez | G06Q 30/02 |
| 9,363,560 B2 | 6/2016 | Moreau et al. | |
| 9,411,862 B1* | 8/2016 | Wang | G06F 17/30557 |
| 2003/0113100 A1* | 6/2003 | Hecht | H04N 5/4401 |
| | | | 386/330 |
| 2007/0156719 A1* | 7/2007 | Upendran | G06F 17/30867 |
| 2007/0192739 A1* | 8/2007 | Hunleth | G06F 3/0481 |
| | | | 715/823 |
| 2007/0266411 A1* | 11/2007 | Yamamoto | A63F 13/10 |
| | | | 725/88 |
| 2010/0281152 A1* | 11/2010 | Istavan | H04N 21/2355 |
| | | | 709/223 |
| 2012/0159389 A1* | 6/2012 | Keith | G06Q 10/00 |
| | | | 715/810 |
| 2014/0095999 A1* | 4/2014 | Lehto | H04N 21/4751 |
| | | | 715/716 |
| 2014/0108503 A1* | 4/2014 | Haykal | H04L 67/02 |
| | | | 709/203 |
| 2014/0236909 A1* | 8/2014 | Cole | G06F 17/30563 |
| | | | 707/694 |
| 2014/0351547 A1* | 11/2014 | Dietterich | G06F 12/0284 |
| | | | 711/170 |
| 2015/0052503 A1* | 2/2015 | Ligman | G06F 11/3664 |
| | | | 717/125 |
| 2017/0126256 A1* | 5/2017 | Salomons | H04L 1/0009 |
| 2017/0244986 A1* | 8/2017 | Pinckernell | H04N 21/23439 |

* cited by examiner

Org. DB 126

| Sub-tree ID 232A | Sub-tree schema 234A | Sub-tree metadata 236A | Content item ID(s) 237A | Content item location(s) 238A |
|---|---|---|---|---|
| ⋮ | ⋮ | ⋮ | ⋮ | ⋮ |
| Sub-tree ID 232N | Sub-tree schema 234N | Sub-tree metadata 236A | Content item ID(s) 237N | Content item location(s) 238N |

231A — top row
231N — bottom row

Content DB 128

| Content item ID 242A | Content 244A | Content metadata 246A |
|---|---|---|
| ⋮ | ⋮ | ⋮ |
| Content item ID 242N | Content 244N | Content metadata 246N |

241A — top row
241N — bottom row

FIG. 2B

METHOD AND DEVICE FOR FIELD TESTING USER INTERFACES BASED ON A FLEXIBLE HIERARCHY STRUCTURE

TECHNICAL FIELD

The present disclosure relates to data hierarchy structures, and in particular, to a flexible hierarchy structure for enabling field testing of user interfaces associated with a media streaming platform.

BACKGROUND

Some media streaming platforms make use of classification hierarchies to define the navigation path for their electronic programming guides (EPGs). Each node within the classification hierarchy represents a landing spot within the EPG, and each node is associated with zero or more content items. For example, a root node represents sports content and associated child nodes represent soccer, swimming, and tennis content categories.

The operator of a media streaming platform may change the classification hierarchy over time to increase the number of views of content or to introduce new services. However, before committing these changes against the entirety of the streaming content platform, the operator of the media streaming platform may wish to perform field trials on a small user group. As such, the field trials allow the operator to witness the effect that a change to the classification hierarchy will make on the user experience (e.g., A/B tests). Today these changes are made within the live classification hierarchy, and often require the duplication of content sub-trees so that they can be moved to a different position within the classification hierarchy.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 2A-2B illustrate block diagrams of data structures in accordance with some implementations.

Figure 1:
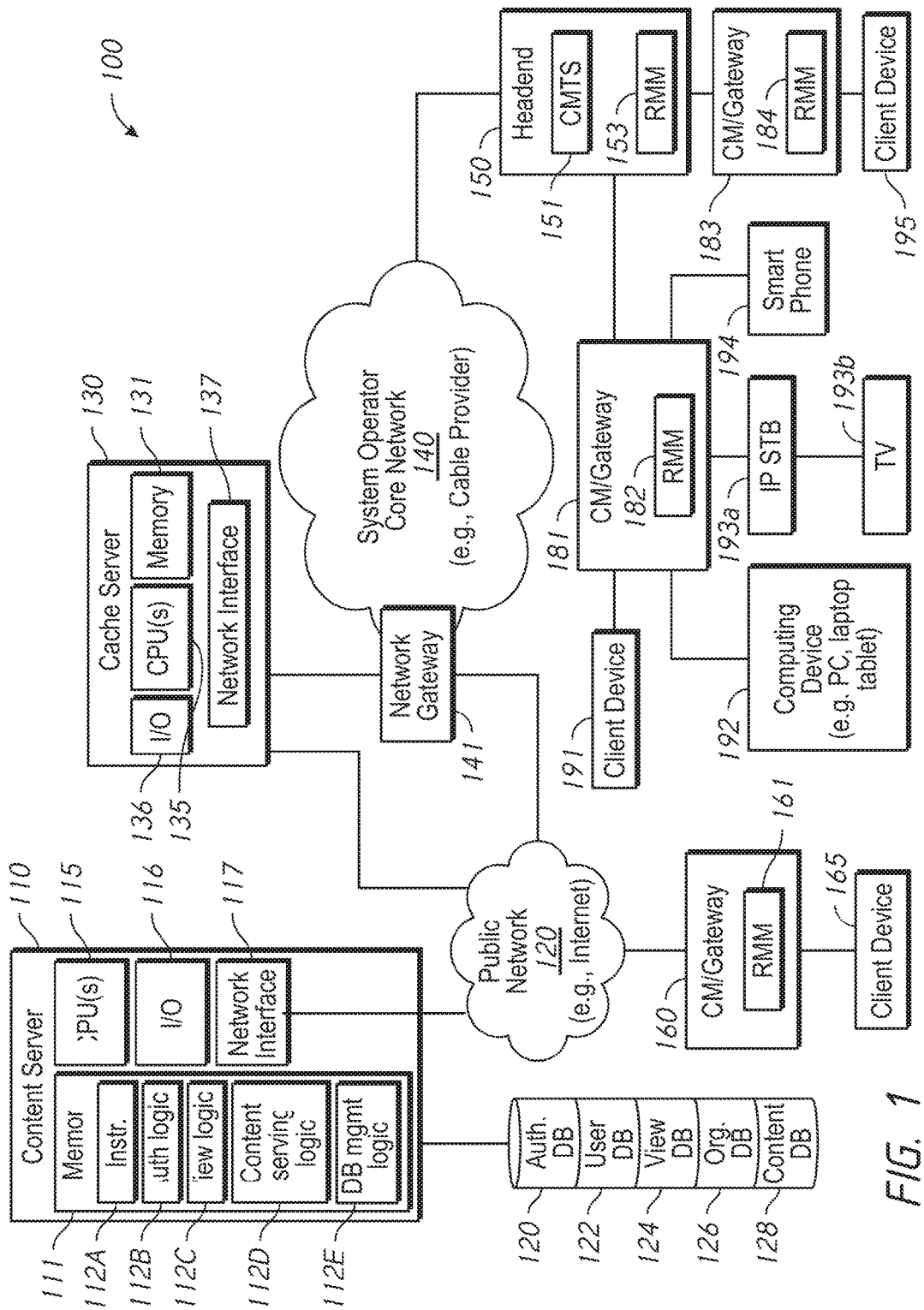
FIG. 1 is a block diagram of a data communication environment in accordance with some implementations.

In accordance with common practice various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION

Numerous details are described herein in order to provide a thorough understanding of the illustrative implementations shown in the accompanying drawings. However, the accompanying drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include devices, systems, and methods for providing a user interface associated with a flexible hierarchy structure. For example, in some implementations, a method includes: receiving a first view request from a first client device; determining a first view group associated with the first client device in response to receiving the first view request; identifying a first view hierarchy based on the first view group, where the first view hierarchy includes a first plurality of pointers to a first plurality of content sub-tree hierarchies associated with content items and the first view hierarchy also includes a first order schema; obtaining the first plurality of content sub-tree hierarchies based on the first plurality of pointers; and transmitting display data associated with a first user interface to the first client device based on the first order schema and the first plurality of content sub-tree hierarchies. According to some implementations, the method is performed by a content server with one or more processors and non-transitory memory.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

Example Embodiments

Previously known methods of field testing changes to a classification hierarchy use significant memory resources due to the duplication of data and leave the media streaming platform vulnerable to errors when making the test hierarchy live. To that end, the nodes (e.g., content sub-trees) that are seen by a user are based on a filtering capability, where the client signals which field trial they are a part of and, in turn, the filtering capability filters out nodes based on the field trial setting. This has at least the following impacts: (A) significantly increases the size of the classification hierarchy, resulting in more memory usage; (B) leaves the classification hierarchy prone to errors as changes in the live sub-trees need to be mirrored within the duplicate sub-tree; (C) makes it difficult for the operator to determine which hierarchy a given user will see; and (D) leaves the platform vulnerable to errors when making the test hierarchy live. Additionally, in some current implementations, various content sub-trees are typically constructed and maintained by different business units. And, in turn, the linking of the content sub-trees is handled by another business unit. This fractured maintenance of the classification hierarchy leaves the platform vulnerable to error when making the test hierarchy live.

By contrast, various implementations disclosed herein disclose a flexible hierarchy structure for field testing user interfaces (UIs) (or views). According to various implementations, the flexible hierarchy structure enables content sub-tree hierarchies to be combined into zero or more view hierarchies. As such, a content sub-tree hierarchy and its associated content items may be modified without modifying view hierarchies that link to the content sub-tree hierarchy. Furthermore, a view hierarchy may be modified or created without modifying the content sub-tree hierarchies (or the associated content items) that the view hierarchy links to. As a result, individual business units are able to manage a respective content sub-tree hierarchy without impacting other content sub-tree hierarchies. This results in a very efficient and flexible solution for defining the hierarchical data structures that are central to the navigation and layout of electronic programming guides (EPGs).

FIG. 1 is a block diagram of a data communication environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data communication environment 100 includes: a public network 120 (e.g., a portion of the Internet), a system operator core network 140 (hereinafter the "core network 140"), a content server 110, a cache server 130, and a headend node 150. The data communication environment 100 also includes subscriber gateway devices 181, 183 and a number of client devices 191, 192, 193a/b, 194, 195.

In some implementations, the core network 140 includes a private and/or subscription-based network. The core network 140 includes any local area network (LAN) and/or wide area network (WAN) such as an intranet, an extranet, a virtual private network, and/or portions of the Internet. In some implementations, the core network 140 provides communication capability between any one of the client devices 191, 192, 193a/b, 194, 195 and one or more third party service providers and/or content providers (e.g., the content server 110, the cache server 130, etc.). In some implementations, the core network 140 provides communication capability between any one of the client devices 191, 192, 193a/b, 194, 195 and one or more private content servers, storage devices, gateways, and/or service servers (not shown), as well as core network provided services and content. In various implementations, the core network 140 includes a combination of computing devices, switches, routers, server systems, enterprise memory, and data connections.

In some implementations, the core network 140 uses Hypertext Transfer Protocol (HTTP) to transport information using the Transmission Control Protocol/Internet Protocol (TCP/IP) suite. HTTP permits client devices to access various resources available via the core network 140 and/or the public network 120. However, implementations are not limited to the use of any particular protocol. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods, and hence, are contemplated to be within the scope of the disclosure.

As shown in FIG. 1, in some implementations, the core network 140 includes a gateway node 141 that provides an interface for data communication external to the core network 140 (e.g., to the public network 120, the content server 110, the cache server 130, etc.). In some implementations, the gateway node 141 is provided as a single entity (e.g., a server, a virtual machine, etc.). In some implementations, the gateway node 141 is implemented as a distributed system including a suitable combination of software, data structures, virtual machines, computing devices, servers, switches, and/or routers. For the sake of brevity and convenience of explanation, the gateway node 141 is described herein as a single entity.

According to some implementations, the headend node 150 is coupled to the core network 140. In some implementations, the headend node 150 is capable of data communication using the public network 120 and/or other private networks (not shown). Those of ordinary skill in the art will appreciate that a headend node is typically configured to deliver cable television (TV), cable modem services, and/or various other data services to subscriber client devices. To that end, a headend node includes a suitable combination of software, data structures, virtual machines, routers, switches, and high-availability servers. For example, the headend node 150 includes a cable modem termination server (CMTS) 151 that is used to service an allocation of bandwidth shared by a number of client devices. The CMTS 151 includes a suitable combination of hardware, software, and/or firmware for terminating one or more data channels associated with a number of client devices within the shared allocation of bandwidth.

In some implementations, the headend node 150 includes a resource management module (RMM) 153 configured to manage, access, or assist in the management of network resources available to the client devices 191, 192, 193a/b, 194, and 195. While the RMM 153 is shown as distinct module, in some implementations, some or all of the functions of the RMM 153 are incorporated into the CMTS or the like.

In some implementations, the client devices 191, 192, 193a/b, 194, 195 access network resources, services, and content offerings from a respective headend node through subscriber gateway devices. For example, as shown in FIG. 1, the subscriber gateway devices 181, 183 are coupled to the headend node 150, and thus share bandwidth (and/or other resources) available through the headend node 150. In various implementations, a subscriber gateway device includes, without limitation, devices such as cable modems (CMs), wireless access points, and/or Ethernet modems.

Each subscriber gateway device 181, 183 is accessible by and services a number of client devices. For example, the client device 195 is coupled to the subscriber gateway device 183. Similarly, the subscriber gateway device 181 is coupled to and delivers services and/or content to a client device 191, a computing device 192, a smartphone 194, and an Internet Protocol (IP) set-top box (STB) 193a (which in turn is coupled to TV 193*b*). As such, the bandwidth allocated to the subscriber gateway device 181 is shared by four devices in the example shown. The bandwidth allocated to the subscriber gateway device 181 is also a portion of the available bandwidth provided by the headend node 150. The headend node 150 also provides bandwidth allocations to the subscriber gateway device 183, which services client device 195. Thus, in this example, the total bandwidth available from the headend node 150 is ultimately shared by five client devices 191, 192, 193*a/b*, 194, and 195. Those of ordinary skill in the art will appreciate from the present disclosure that, in various implementations, a headend node can be connected to any number and combination of gateway nodes and client devices, and FIG. 1 is merely an example provided to discuss aspects of various implementations.

In some implementations, a subscriber gateway device is configured to manage, access, and/or assist in the management of network resources available through the subscriber gateway device to corresponding client devices. To that end, for example, the subscriber gateway device 181 includes a resource management module (RMM) 182. In the example shown in FIG. 1, the RMM 182 is provided to manage, access, or assist in the management of network resources available to the client devices 191, 192, 193*a/b*, and 194. Similarly, the subscriber gateway device 183 includes a resource management module 184.

With continued reference to FIG. 1, the gateway device 160 is accessible by and services client device 165. As such, the client device 165 accesses network resources, services, and content offerings through the gateway device 160 in the example shown. As discussed above, in some implementations, a gateway device is configured to manage, access, and/or assist in the management of network resources available through the gateway device to corresponding client devices. To that end, for example, the gateway device 160 includes a resource management module (RMM) 161. In the example shown in FIG. 1, the RMM 161 is provided to manage, access, or assist in the management of network resources available to the client device 165.

With continued reference to FIG. 1, the content server 110 is configured to store and provide media content data. To that end, the content server 110 typically includes a non-transitory memory 111, one or more processing units (CPUs) 115, an input-output (I/O) interface 116, and a network interface 117. The network interface 117 is configured to enable communication with other devices and systems, and for example, without limitation includes a modulator/demodulator (modem for communication with another device, system, or network), a radio frequency transceiver or another type of transceiver, a telephone interface, a bridge, a router, etc. In some implementations, the I/O interface 116 includes input devices, such as but not limited to, a keyboard, mouse, scanner, microphone, etc. The I/O interface 116 may also include output devices, such as but not limited to, a display, speakers, etc.

With reference to FIG. 1, the memory 111 includes: instructions 112A, authentication logic 112B, view logic 112C, content serving logic 112D, and database management logic 112E. In some implementations, the instructions 112A include programs provided to perform various functions for the content server 110. For example, according to some implementations, the content server 100 provides a media streaming service, which authorized user may access. In some implementations, the authentication logic 112B is configured to authenticate a user to access the media streaming service provided by the content server 110. In some implementations, the view logic 112C is configured to determine a view that corresponds to the authenticated user. In some implementations, the view logic 112C is also configured to transmit, to the client device associated with the authenticated user, display data provided to present a user interface (UI) associated with the determined view. In some implementations, the content serving logic 112D is configured to provide streaming media content to the authenticated user. In some implementations, the database management logic 112E is configured to handle modifications or changes to view hierarchies, content sub-tree hierarchies, and content items.

According to some implementations, the content server 110 or a component thereof (e.g., the database management logic 112E) manages or has access to an authentication database 120, a user database 122, a view database 124, an organization database 126, and a content database 128. In some implementations, the authentication database 120, the user database 122, the view database 124, the organization database 126, and the content database 128 are combined into a single data structure. The authentication database 120, the user database 122, the view database 124, the organization database 126, and the content database 128 are described in greater detail below with reference to FIGS. 2A-2B. In some implementations, the content server 110 stores or has access to encoded media content data (e.g., the content database 128). For example, the encoded media content data includes multiple representations of each of one or more media content data items. In some implementations, a representation of a media content data item is divided into one or more temporal segments, each of which is available with respect to one or more encoding rates, resolutions, formats, digital rights management (DRM) schemes, etc.

The cache server 130 is configured to provide replicas of at least some of the media content data and associated metadata stored and provided by the content server 110. In various implementations, the cache server 130 is similarly configured to the content server 110, and includes, without limitation, one or more processing units (CPUs) 135, non-transitory memory 131, a network interface 137, and an I/O interface 136. In some implementations, a request for media content data item from a client device is initially directed to or redirected to the cache server 130, when the cache server 130 is closer to the client device than the content server 110. The cache server 130 can also be used to supplement the content server 110 during times of excessive traffic.

In operation, the client devices 165, 191, 192, 193*a/b*, 194, and 195 are each able to select segment representations. In some implementations, a client device selects a temporal segment based on a respective portion of the bandwidth allocated to the client device. For example, the client device selects segment representation corresponding to the highest encoding rate available for the next temporal segment of the media content data item. Additionally, in ABR-enabled implementations, a client device is able to exceed the bandwidth allocated to it when other portions of the bandwidth on link are underutilized, and thus select segment representations with higher encoding rates that are normally supported by the bandwidth nominally allocation to the client device.

In some implementations, the client devices 165, 191, 192, 193*a/b*, 194, and 195 generally include any suitable computing device, such as a computer, a laptop computer, a tablet device, a netbook, an internet kiosk, a personal digital assistant, a mobile phone, a smartphone, a wearable computing device, a gaming device, a set-top box, an over-the-top box, an Internet-of-things device, a home appliance, a computer server, or the like. In some implementations, each client device includes one or more processors, non-transitory memory, a network interface (e.g., a network interface card (NIC), transceiver, antenna, mixer, tuner, demodulator, and/or the like), a decoder engine, and/or the like. In some implementations, each client device also includes a display and/or other user interface components such as a keyboard, a keypad, a touch screen display, a mouse, a track-pad, a digital camera, and/or any number of supplemental devices to add input/output (I/O) functionality.

Figure 2A:
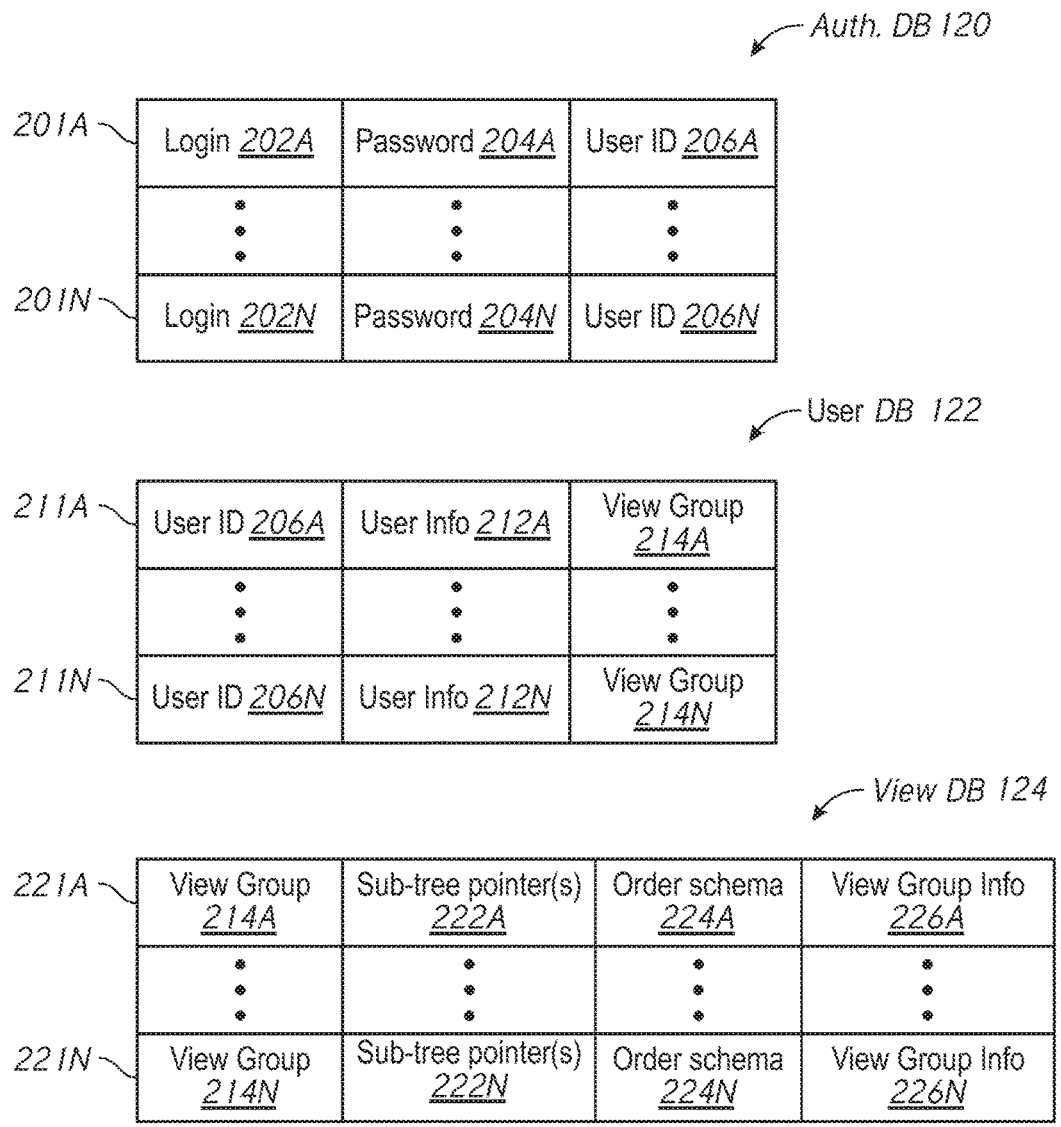

FIGS. 2A-2B illustrate block diagrams of data structures in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations, as shown in FIGS. 2A-2B, the authentication database 120, the user database 122, the view database 124, the organization database 126, and the content database 128 are separate data structures. According to some implementations, the authentication database 120, the user database 122, the view database 124, the organization database 126, and the content database 128 are combined into a single data structure. According to some implementations, the authentication database 120, the user database 122, the view database 124, the organization database 126, and the content database 128 are located in a same location (e.g., the content server 110, FIG. 1). In some implementations, the authentication database 120, the user database 122, the view database 124, the organization database 126, and the content database 128 are located in different locations or distributed across different locations.

As shown in FIG. 2A, the authentication database 120 includes a plurality of user credential entries 201A, . . . , 201N (sometimes collectively referred to herein as the "user credential entries 201") each associated with credentials of a user account. For example, the entry 201A is associated with a first user and includes a login 202A (e.g., a user name or login handle) for a first user, a password 204A (e.g., a clear text password, a hash of a passcode, an encryption key, etc.) for the first user, and a user identifier (ID) 206A (e.g., a unique number) for the first user. Similarly, the entry 201N is associated with an N-th user and includes a login 202N (e.g., a user name or login handle) for the N-th user, a password 204N (e.g., a clear text password, a hash of a passcode, an encryption key, etc.) for the N-th user, and a user ID 206N (e.g., a unique number) for the N-th user. In some implementations, when a user attempts to access the media streaming service provided by the content server 110, the user is prompted to provide login credentials such as a login and password. Thereafter, the content server 110 or a component thereof (e.g., the authentication logic 112B, FIG. 1) identifies a user ID based on the provided login credentials.

As shown in FIG. 2A, the user database 122 includes a plurality of user information entries 211A, . . . , 211N (sometimes collectively referred to herein as the "user information entries 211") each associated with a user account. For example, the entry 211A is associated with the first user and includes the user ID 206A (e.g., a unique number) for the first user, user information 212A (e.g., biographical information, geographic location, preferences, subscription details, etc.) associated with the first user, and a view group 214A (e.g., a view identifier (ID) that corresponds to a standard view, a region specific view, a field trial view, etc.) for the first user. Similarly, the entry 211N is associated with the N-th user and includes the user ID 206N (e.g., a unique number) for the N-th user, user information 212N (e.g., biographical information, location, preferences, subscription details, etc.) associated with the N-th user, and a view group 214N (e.g., a view ID that corresponds to a standard view, a region specific view, a field trial view, etc.) for the N-th user. In some implementations, after identifying the user ID, the content server 110 or a component thereof (e.g., the view logic 112C, FIG. 1) identifies a view group for the user based on the user ID. According to some implementations, the authentication database 120 and the user database 122 are combined into a single data structure.

As shown in FIG. 2A, the view database 124 includes a plurality of view group entries 221A, . . . , 221N (sometimes collectively referred to herein as the "view group entries 221") each associated with a view group. For example, the entry 221A is associated with a first view group and includes the view group 214A (e.g., an ID and/or name associated with the first view group), one or more content sub-tree pointers 222A (e.g., pointers to or identifiers (IDs) for content sub-tree hierarchies associated with the first view group), an order schema 224A (e.g., an indication of the ordering or layout for the first view group such as a plurality of parent node pointers and/or view hierarchy sub-nodes), and view group information 226A for the first view group (e.g., an expiration date, licensing information, etc.). Similarly, the entry 221N is associated with an N-th view group and includes the view group 214N (e.g., an ID and/or name associated with the N-th view group), one or more content sub-tree pointers 222N (e.g., pointers to or IDs for content sub-tree hierarchies for the N-th view group), an order schema 224N (e.g., an indication of the ordering or layout for the N-th view group such as a plurality of parent node pointers and/or view hierarchy sub-nodes), and view group information 226N for the N-th view group (e.g., an expiration date, licensing information, etc.). In some implementations, after identifying the view group for the user, the content server 110 or a component thereof (e.g., the view logic 112C, FIG. 1) identifies a view hierarchy for the view group that includes one or more content sub-tree pointers and an order schema for the view hierarchy.

As shown in FIG. 2B, the organization database 126 includes a plurality of content sub-tree entries 231A, . . . , 231N (sometimes collectively referred to herein as the "content sub-tree entries 231") each associated with a content sub-tree hierarchy. For example, the entry 231A is associated with a first content sub-tree hierarchy and includes a content sub-tree ID 232A (e.g., an ID associated with the first content sub-tree hierarchy), a sub-tree schema 234A (e.g., an indication of the ordering or layout for the first content sub-tree hierarchy), sub-tree metadata 236A associated with the first content sub-tree hierarchy (e.g., available encodings, age, etc.), one or more content item IDs 237A for the content items that correspond to the first content sub-tree hierarchy, and one or more content item locations (or pointers) 238A associated with the one or more content items that correspond to the first content sub-tree hierarchy. Similarly, the entry 231N is associated with an N-th content sub-tree hierarchy and includes a content sub-tree ID 232N (e.g., an ID associated with the N-th content sub-tree hierarchy), a sub-tree schema 234N (e.g., an indication of the ordering or layout for the N-th content sub-tree hierarchy), sub-tree metadata 236N associated with the N-th content sub-tree hierarchy (e.g., available encodings, age, etc.), one or more content item IDs 237N for the content items that correspond to the N-th content sub-tree hierarchy, and one or more content item locations (or pointers) 238N associated with the one or more content items that correspond to the N-th content sub-tree hierarchy. In some implementations, after identifying the view hierarchy, the content server 110 or a component thereof (e.g., the view logic 112C, FIG. 1) identifies a content sub-tree entry for each of the content sub-tree pointers that correspond to the view hierarchy. According to some implementations, the content server 110 or a component thereof (e.g., the view logic 112C, FIG. 1) transmits, to the client device of the user, display data provided to present a user interface (UI) associated with the view based on the order schema that corresponds to the view hierarchy and the identified content sub-tree entries.

As shown in FIG. 2B, the content database 128 includes a plurality of content item entries 241A, . . . , 241N (sometimes collectively referred to herein as the "content item entries 241") each associated with a content item. For example, the entry 241A is associated with a first content item and includes a content item ID 242A (e.g., an ID associated with the first content item), the content item 244A (e.g., including one or more encodings of the first content item according to different bit-rates, resolutions, DRM schemes, formats, etc.), and content metadata 246A associated with the first content sub-tree hierarchy (e.g., release date, playback length, subtitles, content description, actor names and biographies, Motion Picture Association of America (MPAA) rating, user ratings and reviews, etc.). Similarly, the entry 241N is associated with an N-th content item and includes a content item ID 242A (e.g., an ID associated with the N-th content item), the content item 244N (e.g., including one or more encodings of the N-th content item according to different bit-rates, resolutions, DRM schemes, formats, etc.), and content metadata 246N associated with the N-th content sub-tree hierarchy (e.g., subtitles, content description, actors, release date, length, MPAA rating, reviews, user ratings, etc.). In some implementations, after obtaining a content request to view a content item from the user (e.g., an HTTP GET request), the content server 110 or a component thereof (e.g., the content request logic 112D, FIG. 1) identifies one of the content item entries 241 associated with the content request and provides the corresponding content item to the user.

Figure 3:
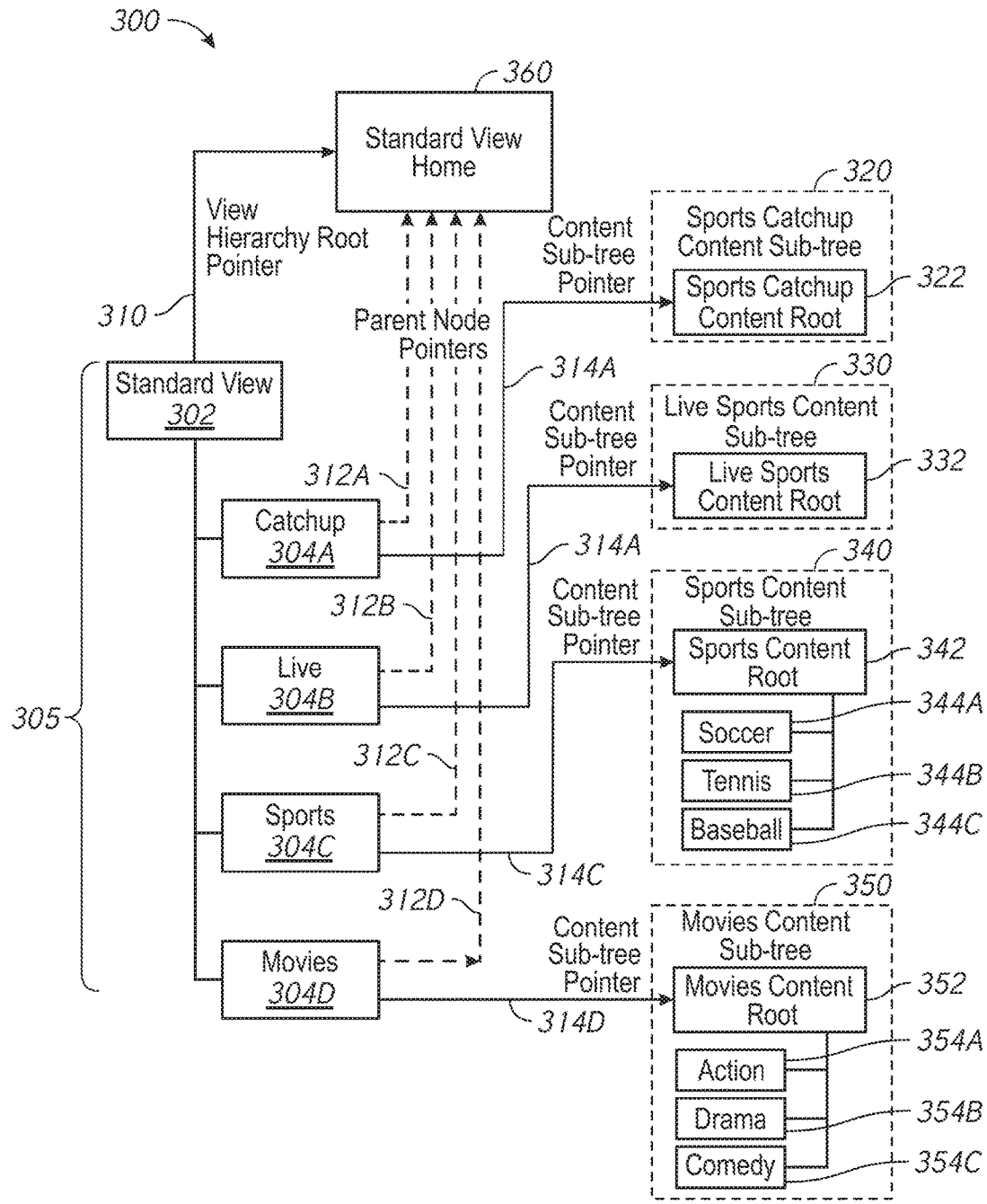
FIG. 3 is an example data relationship diagram between a view hierarchy and content sub-tree hierarchies in accordance with some implementations.

FIG. 3 is an example data relationship diagram 300 between a view hierarchy 305 and content sub-tree hierarchies 320, 330, 340, and 350 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations, as shown in FIG. 3, the view hierarchy 305, which corresponds to the standard view, is linked to a plurality of content sub-tree hierarchies 320, 330, 340, and 350. As such, on one hand, a view hierarchy may be modified without changing the underlying content sub-tree hierarchies. And, on the other hand, a content sub-tree hierarchy may be modified without changing associated view hierarchies. As a result, different view hierarchies may be field tested without maintaining duplicate content hierarchies. Furthermore, the content sub-tree hierarchies are isolated such that they be maintained by different business units within a content provider entity without effecting other content sub-tree hierarchies and without creating duplicate content hierarchies.

As shown in FIG. 3, the view hierarchy 305 includes a view hierarchy root node 302 corresponding to a standard view, and a plurality of view hierarchy sub-nodes 304A, 304B, 304C, and 304D (sometimes collectively referred to herein as the "view hierarchy sub-nodes 304"), corresponding to the catchup, live, sports, and movies categories, respectively. According to some implementations, the view hierarchy sub-nodes 304 comprise the categories or regions of the standard view. As shown in FIG. 3, the plurality of the view hierarchy sub-nodes 304 have an order schema (e.g., top-to-bottom) corresponding to the order or layout of the user interface (UI) that corresponds to the standard view.

As shown in the FIG. 3, the sports catchup content sub-tree hierarchy 320 includes a sports catchup content root node 322 that corresponds to one or more sports catchup content items such as daily highlights, weekly top ten plays, etc. In FIG. 3, the live sports content sub-tree hierarchy 330 includes a live sports content root node 332 that corresponds to one or more live sports content items such as live games or sporting events. In FIG. 3, for example, the on-demand sports content sub-tree hierarchy 340 includes an on-demand sports content root node 342 and associated content sub-nodes 344A, 344B, and 344C related to soccer, tennis, and baseball content items, respectively. For example, as shown in the FIG. 3, the movies content sub-tree hierarchy 350 includes a movies content root node 352 and associated content sub-nodes 354A, 354B, and 354C related to action, drama, and comedy movies content items, respectively.

In some implementations, the view hierarchy root node 302 includes a view hierarchy root pointer 310 that points to the standard view home node 360. According to some implementations, each of the view hierarchy sub-nodes 304 includes one of the parent node pointers 312A, 312B, 312C, and 312D (sometimes collectively referred to as the "parent node pointers 312") and one of the content sub-tree pointers 314A, 314B, 314C, and 314D (sometimes collectively referred to as the "content sub-tree pointers 314" or the "sub-tree pointers 314" or the "content sub-tree hierarchy pointers 314"). In some implementations, each of the content sub-tree pointers 314 points to a content sub-tree hierarchy.

As shown in FIG. 3, the view hierarchy sub-node 304A that corresponds to the catchup category is associated with the parent node pointer 312A that points to the standard view home node 360 and the content sub-tree pointer 314A that points to the sports catchup content root node 322. The view hierarchy sub-node 304B that corresponds to the live category is associated with the parent node pointer 312B that points to the standard view home node 360 and the content sub-tree pointer 314B that points to the live sports content root node 332. The view hierarchy sub-node 304C that corresponds to the sports category is associated with the parent node pointer 312C that points to the standard view home node 360 and the content sub-tree pointer 314C that points to the on-demand sports content root node 342. The view hierarchy sub-node 304D that corresponds to the movies category is associated with the parent node pointer 312D that points to the standard view home node 360 and the content sub-tree pointer 314D that points to the movies content root node 352.

In some implementations, each of the parent node pointers 312 is assigned a monotonically increasing integer that determines the order schema for the view hierarchy 305. As one example, the parent node pointer 312A associated with the view hierarchy sub-node 304A is assigned the value 1 (e.g., first in the order schema), the parent node pointer 312B associated with the view hierarchy sub-node 304B is assigned the value 2, the parent node pointer 312C associated with the view hierarchy sub-node 304C is assigned the value 3, and the parent node pointer 312D associated with the view hierarchy sub-node 304D is assigned the value 4 (e.g., last in the order schema).

As will be appreciated by one of ordinary skill in the art, the number of sub-nodes and the categories associated with the view hierarchy 305, and content items associated with the content sub-tree hierarchies 320, 330, 340, and 350 shown in FIG. 3 are merely non-limiting examples. In various other embodiments, the view hierarchy 305 may have a different number of sub-nodes and different categories, and the content sub-tree hierarchies 320, 330, 340, and 350 may be associated with different content items.

Figure 4:
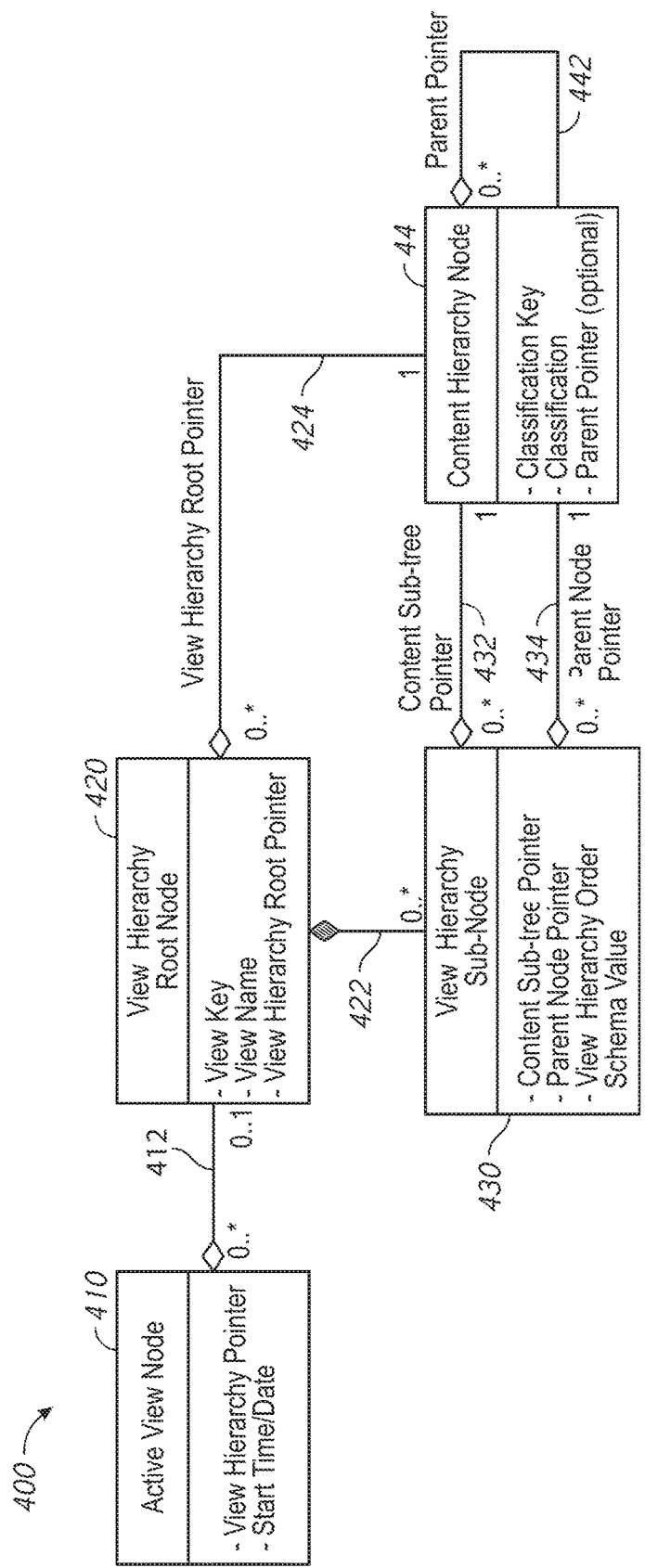
FIG. 4 is an example simplified modeling diagram for view hierarchies in accordance with some implementations.

FIG. 4 is an example simplified modeling diagram 400 for view hierarchies in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations, the modeling diagram 400 includes: an active view node 410, a view hierarchy root node 420, a view hierarchy sub-node 430, and a content hierarchy node 440. According to some implementations, as shown in FIG. 4, the modeling diagram 400 is illustrated according to the uniform modeling language (UML).

Figure 5:
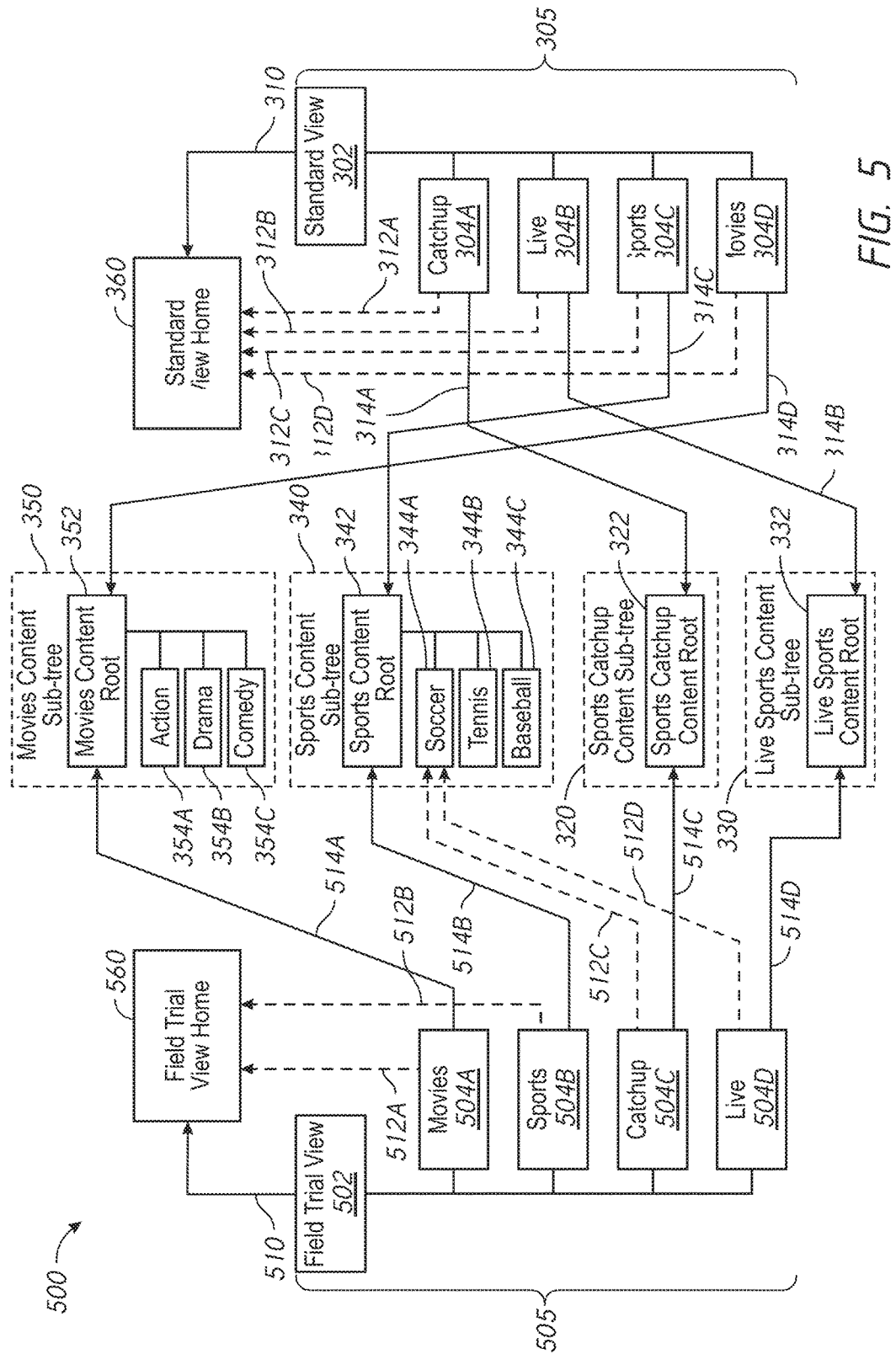
FIG. 5 is an example data relationship diagram between multiple view hierarchies and content sub-tree hierarchies in accordance with some implementations.

As shown in FIG. 4, the active view node 410 corresponds to a view hierarchy (e.g., the standard view hierarchy 305 or the field trial view hierarchy 505 in FIG. 5) and includes a view hierarchy pointer (e.g., a unique identifier (ID) or view-key for a view hierarchy root node) and a start date/time. The active view node 410 is associated with the view hierarchy root node 420 via link 412 (e.g., the view hierarchy pointer) such that the active view node 410 is associated with zero to one view nodes and the view hierarchy root node 420 is associated with one or more active view nodes.

As shown in FIG. 4, the view hierarchy root node 420 corresponds to a root node of a view hierarchy (e.g., the view hierarchy root node 302 corresponding to the standard view or the view hierarchy root node 502 corresponding to the field trial view in FIG. 5). The view hierarchy root node 420 includes a view-key, a view name, and a view hierarchy root pointer. The view hierarchy root node 420 is associated with the view hierarchy sub-node 430 via link 422 such that the view hierarchy root node 420 comprises one or more view hierarchy sub-nodes. For example, with reference to FIG. 3, the view hierarchy sub-nodes 304A, 304B, 304C, and 304D comprise the view hierarchy root node 302 corresponding to the standard view. The view hierarchy root node 420 is associated with the content hierarchy node 440 via link 424 (e.g., the view hierarchy root pointer) such that the view hierarchy root node 420 is associated with one content hierarchy node and the content hierarchy node 440 is associated with one or more view hierarchy root nodes.

As shown in FIG. 4, the view hierarchy sub-node 430 corresponds to a sub-node of a view hierarchy (e.g., the view hierarchy sub-node 304A corresponding to the movies category of the standard view or the view hierarchy sub-node 504A corresponding to the catchup category of the field trial view in FIG. 5). The view hierarchy sub-node 430 includes a parent node pointer, a content sub-tree pointer, and a view hierarchy order schema value. As one example, the parent node pointer 312A associated with the view hierarchy sub-node 304A is assigned the value 1 (e.g., first in the order schema). The view hierarchy sub-node 430 is associated with the content hierarchy node 440 via link 432 (e.g., the content sub-tree pointer) such that the view hierarchy sub-node 430 is associated with one content hierarchy node and the content hierarchy node 440 is associated with one or more view hierarchy sub-nodes. The view hierarchy sub-node 430 is associated with the content hierarchy node 440 via link 4342 (e.g., the parent node pointer) such that the view hierarchy sub-node 430 is associated with one content hierarchy node and the content hierarchy node 440 is associated with one or more view hierarchy sub-nodes.

As shown in FIG. 4, in some implementations, the content hierarchy node 440 corresponds to a content sub-tree or a content sub-tree root node (e.g., the sports catchup content sub-tree 320 or the on-demand sports content root node 322 in FIG. 3). The content hierarchy node 440 includes a classification key, a classification, and optionally zero or more parent pointers. According to some implementations, the classification characterizes the content item(s) associated with the content hierarchy node (e.g., the type of content). According to some implementations, the classification key is a unique identifier associated with the classification that characterizes the content item(s) associated with the content hierarchy node. In some implementations, the content hierarchy node 440 is associated zero or more other content hierarchy nodes with the via the link 442 (e.g., the parent pointer). As one example, with reference to FIG. 3, the on-demand sports content root node 342 is associated with the content sub-nodes 344A, 344B, and 344C. As another example, with reference to FIG. 3, the sports catchup content root node 322 is not associated with any children content sub-nodes.

FIG. 5 is an example data relationship diagram 500 between view hierarchies 305 and 505, and the sub-tree hierarchies 320, 330, 340, and 350 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations, as shown in FIG. 5, the view hierarchy 305 associated with the standard view and the view hierarchy 505 associated with the field view are both linked to the plurality of content sub-tree hierarchies 320, 330, 340, and 350.

The data relationship diagram 500 shown in FIG. 5 is similar to an adapted from the data relationship diagram 300 provided in FIG. 3. Elements common to FIGS. 3 and 5 include common reference numbers, and only the differences between FIGS. 3 and 5 are described herein for the sake of brevity. To that end, the view hierarchy 505 includes a view hierarchy root node 502 corresponding to a field trial view, and a plurality of view hierarchy sub-nodes 504A, 504B, 504C, and 504D (sometimes collectively referred to herein as the "view hierarchy sub-nodes 504"), corresponding to the movies, sports, catchup, and live categories, respectively. According to some implementations, the view hierarchy sub-nodes 504 comprise the categories or regions of the field trial view. As shown in FIG. 5, the plurality of the view hierarchy sub-nodes 504 have an order schema (e.g., top-to-bottom) corresponding to the order or layout of the UI that corresponds to the field trial view.

In some implementations, the view hierarchy root node 502 includes a view hierarchy root pointer 510 that points to the field trial view home node 560. According to some implementations, each of the view hierarchy sub-nodes 504 includes one of the parent node pointers 512A, 512B, 512C, and 512D (sometimes collectively referred to as the "parent node pointers 512") and one of the content sub-tree pointers 514A, 514B, 514C, and 514D (sometimes collectively referred to as the "content sub-tree pointers 514" or the "content sub-tree pointers 514" or the "content sub-tree hierarchy pointers 514"). In some implementations, each of the content sub-tree pointers 514 points to a content sub-tree hierarchy.

As shown in FIG. 5, the view hierarchy sub-node 504A that corresponds to the movies category is associated with the parent node pointer 512A that points to the field trial view home node 560 and the content sub-tree pointer 514A that points to the movies content root node 352. The view hierarchy sub-node 504B that corresponds to the sports category is associated with the parent node pointer 512B that points to the field trial view home node 560 and the content sub-tree pointer 514B that points to the sports on-demand sports content root node 342. The view hierarchy sub-node 504C that corresponds to the catchup category is associated with the parent node pointer 512C that points to the soccer content sub-node 344A and the content sub-tree pointer 514C that points to the sports catchup content root node 322. The view hierarchy sub-node 504D that corresponds to the catchup category is associated with the parent node pointer 512D that points to the soccer content sub-node 344A and the content sub-tree pointer 514D that points to the live sports content root node 332.

As will be appreciated by one of ordinary skill in the art, the number of sub-nodes and the categories associated with the view hierarchies 305 and 505, and content items associated with the content sub-tree hierarchies 320, 330, 340, and 350 shown in FIG. 5 are merely non-limiting examples. In various other embodiments, the view hierarchies 305 and 505 may have a different number of sub-nodes and different categories, and the content sub-tree hierarchies 320, 330, 340, and 350 may be associated with different content items.

Figure 6A:
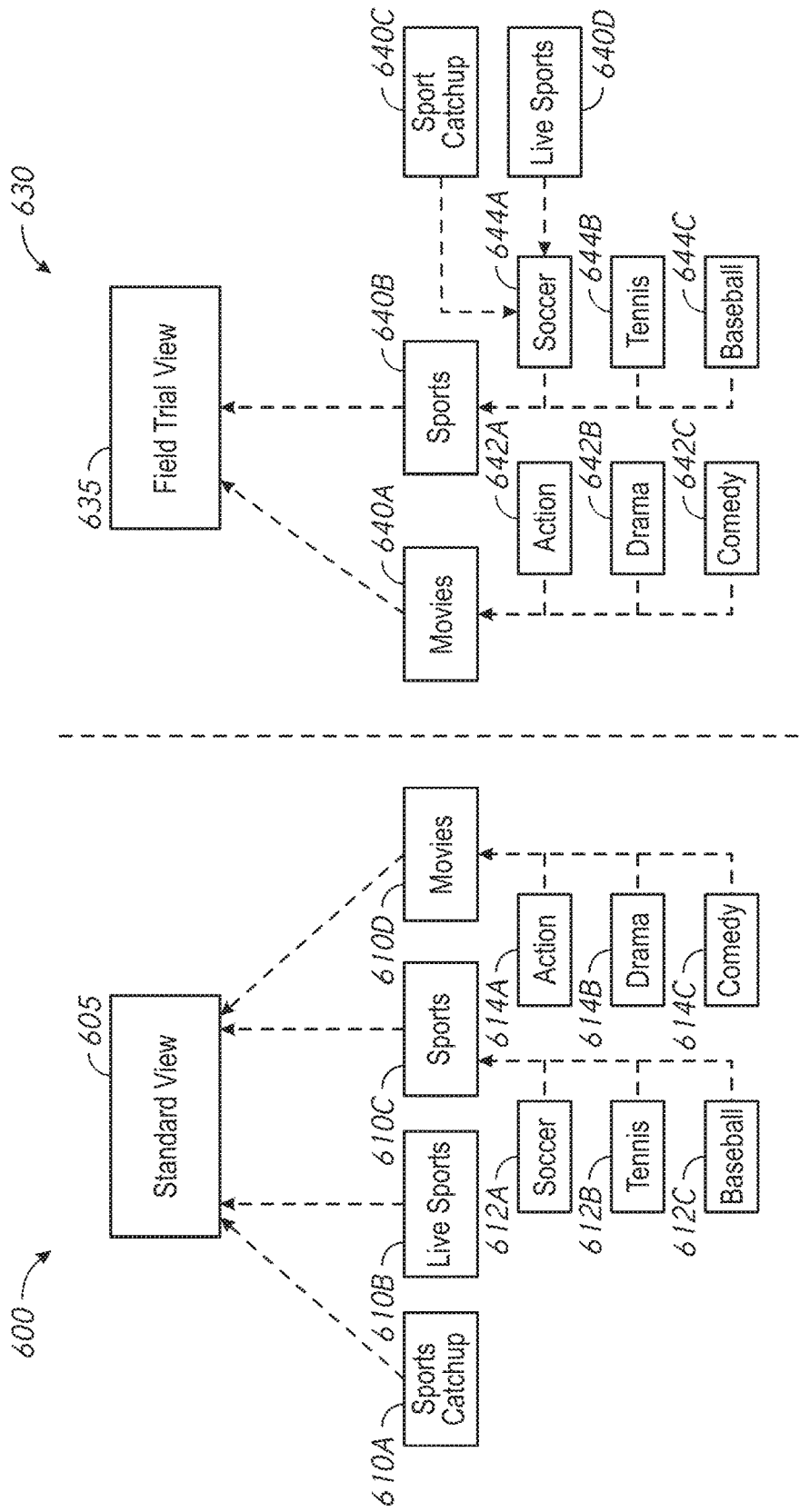
FIG. 6A illustrates block diagrams of example graphical user interfaces (GUIs) for the view hierarchies in FIG. 5 in accordance with some implementations.

FIG. 6A illustrates a first block diagram 600 of an example graphical user interface (GUI) for the view hierarchy 305 in FIGS. 3 and 5 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations, as shown in FIG. 6A, the block diagram 600 corresponds to the view hierarchy 305 in FIGS. 3 and 5 that corresponds to the standard view. To that end, the block diagram 600 shows the order schema associated with the standard view 605 with content categories (or regions) from left-to-right.

As such, according to some implementations, the standard view 605 includes a first category 610A associated with sports catchup content, a second category 610B associated with live sports content, a third category 630C associated with on-demand sports content, and a fourth category 610D associated with movies content. As shown in FIG. 6A, the third category 630C associated with on-demand sports content includes sub-categories (or sub-regions) for soccer content 612A, tennis content 612B, and baseball content 612C. As shown in FIG. 6A, the fourth category 630D associated with movies content includes sub-categories (or sub-regions) for action content 614A, drama content 614B, and comedy content 614C.

Figure 6B:
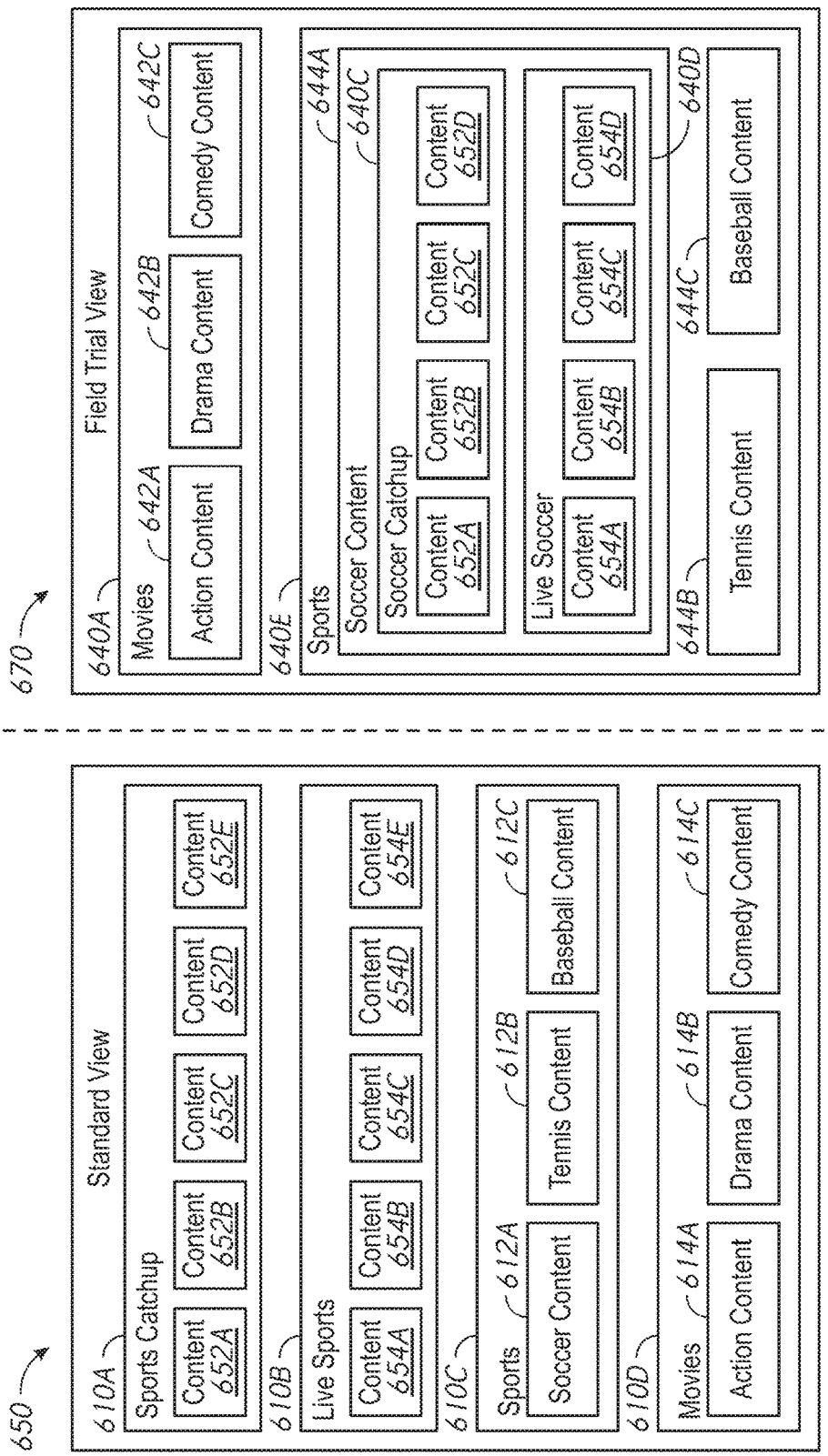
FIG. 6B illustrates example GUIs for the view hierarchies in FIG. 5 in accordance with some implementations.

According to some implementations, the user interface 650 associated with the standard view in FIG. 6B corresponds to a graphic form of the block diagram 600 in FIG. 6A. In some implementations, the first category 610A includes an indication or reference to the sports catchup content sub-tree hierarchy 320 in FIGS. 3 and 5. As one example, the first category 610A includes one or more text or graphic representations of the content associated with the sports catchup content sub-tree hierarchy 320. In some implementations, the second category 610B includes an indication or reference to the live sports content sub-tree hierarchy 330 in FIGS. 3 and 5. As one example, the second category 610B includes one or more text or graphic representations of the content associated with the live sports content sub-tree hierarchy 330. In some implementations, the third category 610C includes an indication or reference to the on-demand sports content sub-tree hierarchy 340 in FIGS. 3 and 5. As one example, the third category 610C includes one or more text or graphic representations of the content associated with the on-demand sports content sub-tree hierarchy 340. In some implementations, the fourth category 610D includes an indication or reference to the movies content sub-tree hierarchy 350 in FIGS. 3 and 5. As one example, the fourth category 610D includes one or more text or graphic representations of the content associated with the movies content sub-tree hierarchy 350.

FIG. 6A also illustrates a second block diagram 630 of an example GUI for the view hierarchy 505 in FIG. 5 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. As a non-limiting example, in some implementations, as shown in FIG. 6A, the block diagram 630 corresponds to the view hierarchy 505 in FIG. 5 that corresponds to the field trial view. To that end, the block diagram 630 shows the order schema associated with the field trial view 635 with content categories (or regions) from left-to-right.

As such, according to some implementations, the field trial view 635 includes a first category 640A associated with movies content, a second category 640B associated with on-demand sports content, a third category 640C associated with sports catchup content, and a fourth category 640D associated with live sports content. As shown in FIG. 6A, first category 640A associated with movies content includes sub-categories (or sub-regions) for action content 642A, drama content 642B, and comedy content 642C. As shown in FIG. 6A, the second category 640B associated with on-demand sports content includes sub-categories (or sub-regions) for soccer content 644A, tennis content 644B, and baseball content 644C. Furthermore, as shown in FIG. 6A, the third category 640C and the fourth category 640D are child categories under the soccer content 644A sub-category.

According to some implementations, the user interface 670 associated with the field trial view in FIG. 6B corresponds to a graphic form of the block diagram 630 in FIG. 6A. In some implementations, the first category 640A includes an indication or reference to the sports movies content sub-tree hierarchy 350 in FIGS. 3 and 5. As one example, the first category 640A includes one or more text or graphic representations of the content associated with the movies content sub-tree hierarchy 350. In some implementations, the second category 640B includes an indication or reference to the on-demand sports content sub-tree hierarchy 340 in FIGS. 3 and 5. As one example, the second category 640B includes one or more text or graphic representations of the content associated with the on-demand sports content sub-tree hierarchy 340. In some implementations, the third category 640C includes an indication or reference to the sports catchup content sub-tree hierarchy 320 in FIGS. 3 and 5. As one example, the third category 640C includes one or more text or graphic representations of the content associated with the sports catchup content sub-tree hierarchy 320. In some implementations, the fourth category 640D includes an indication or reference to the live sports content sub-tree hierarchy 330 in FIGS. 3 and 5. As one example, the fourth category 640D includes one or more text or graphic representations of the content associated with the live sports content sub-tree hierarchy 330.

FIG. 6B illustrates a first example GUI 650 for the view hierarchy 305 in FIGS. 3 and 5 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. The first GUI 650 shown in FIG. 6B is similar to an adapted from the block diagram 600 provided in FIG. 6A. Elements common to FIGS. 6A and 6B include common reference numbers, and only the differences between FIGS. 6A and 6B are described herein for the sake of brevity. To that end, as a non-limiting example, the first GUI 650 corresponds to the view hierarchy 305 in FIGS. 3 and 5 that corresponds to the standard view. For example, display data provided to present the first GUI 650 is transmitted from the content sever 110 to a client device. Continuing with this example, in turn, the client device displays the first GUI 650.

As shown in FIG. 6B, the first GUI 650 includes the first category 610A associated with sports catchup content within a first region. The first region includes sports catchup content items 652A, 652B, 652C, 652D, and 652E (sometimes collectively referred to herein as the "sports catchup content items 652"). In FIG. 6B, the first GUI 650 also includes the second category 610B associated with live sports content within a second region. The second region includes live sports content items 654A, 654B, 654C, 654D, and 654E (sometimes collectively referred to herein as the "live sports content items 654"). For example, the sports catchup content items 652 and the live sports content items 644 correspond to text or graphic representations of content items. For example, in response to a user input selecting one of the live sports content items, the client device sends a request to initiate streaming of the selected live sports content item. Continuing with this example, in turn, the content server transmits a media content stream associated with the selected live sports content item to the client device.

As shown in FIG. 6B, the first GUI 650 further includes the third category 610C associated with on-demand sports content within a third region. The third region includes sub-regions for soccer content 612A, tennis content 612B, and baseball content 612C (sometimes collectively referred to herein as the "sub-regions 612"). In FIG. 6B, the first GUI 650 further includes the fourth category 610D associated with movies content within a fourth region. The fourth region includes sub-regions for action content 614A, drama content 614B, and comedy content 614C (sometimes collectively referred to herein as the "sub-regions 614"). For example, in response to a user input selecting the soccer content sub-region 612A, the client device displays text or graphic representations of content items associated with the soccer category.

FIG. 6B illustrates a second example GUI 670 for the view hierarchy 505 in FIG. 5 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. The second GUI 670 shown in FIG. 6B is similar to an adapted from the block diagram 630 provided in FIG. 6A. Elements common to FIGS. 6A and 6B include common reference numbers, and only the differences between FIGS. 6A and 6B are described herein for the sake of brevity. To that end, as a non-limiting example, the second GUI 670 corresponds to the view hierarchy 505 in FIG. 5 that corresponds to the field trial view. For example, display data provided to present the second GUI 670 is transmitted from the content sever 110 to a client device. Continuing with this example, in turn, the client device displays the second GUI 670.

As shown in FIG. 6B, the second GUI 670 includes the first category 640A associated with movies content within a first region. The first region includes sub-regions for action content 642A, drama content 642B, and comedy content 642C (sometimes collectively referred to herein as the "sub-regions 642"). In FIG. 6B, the second GUI 670 also includes the second category 640B associated with on-demand sports content within a second region. The second region includes sub-regions for soccer content 644A, tennis content 644B, and baseball content 644C (sometimes collectively referred to herein as the "sub-regions 644").

As shown in FIG. 6B, the soccer catchup category 640C and the live soccer category 640D are nested within the sub-region for the soccer content 642A. As such, the sub-region for the soccer content 642A includes the third category 640C associated with soccer catchup content within a first child region and the fourth category 640D associated with live soccer content within a second child region. The first child region includes soccer catchup content items 652A, 652B, 652C, and 652D. The second child region includes live soccer content items 654A, 654B, 654C, and 654D. For example, in response to a user input selecting one of the live soccer content item 652A, the client device sends a request to initiate streaming of the selected the live soccer content item 652A. Continuing with this example, in turn, the content server transmits a media content stream associated with the live soccer content item 652A to the client device.

As will be appreciated by one of ordinary skill in the art, the GUIs 650 and 670 shown in FIG. 6B are merely non-limiting examples. In various other embodiments, the GUIs 650 and 670 may have different layouts.

Figure 7:
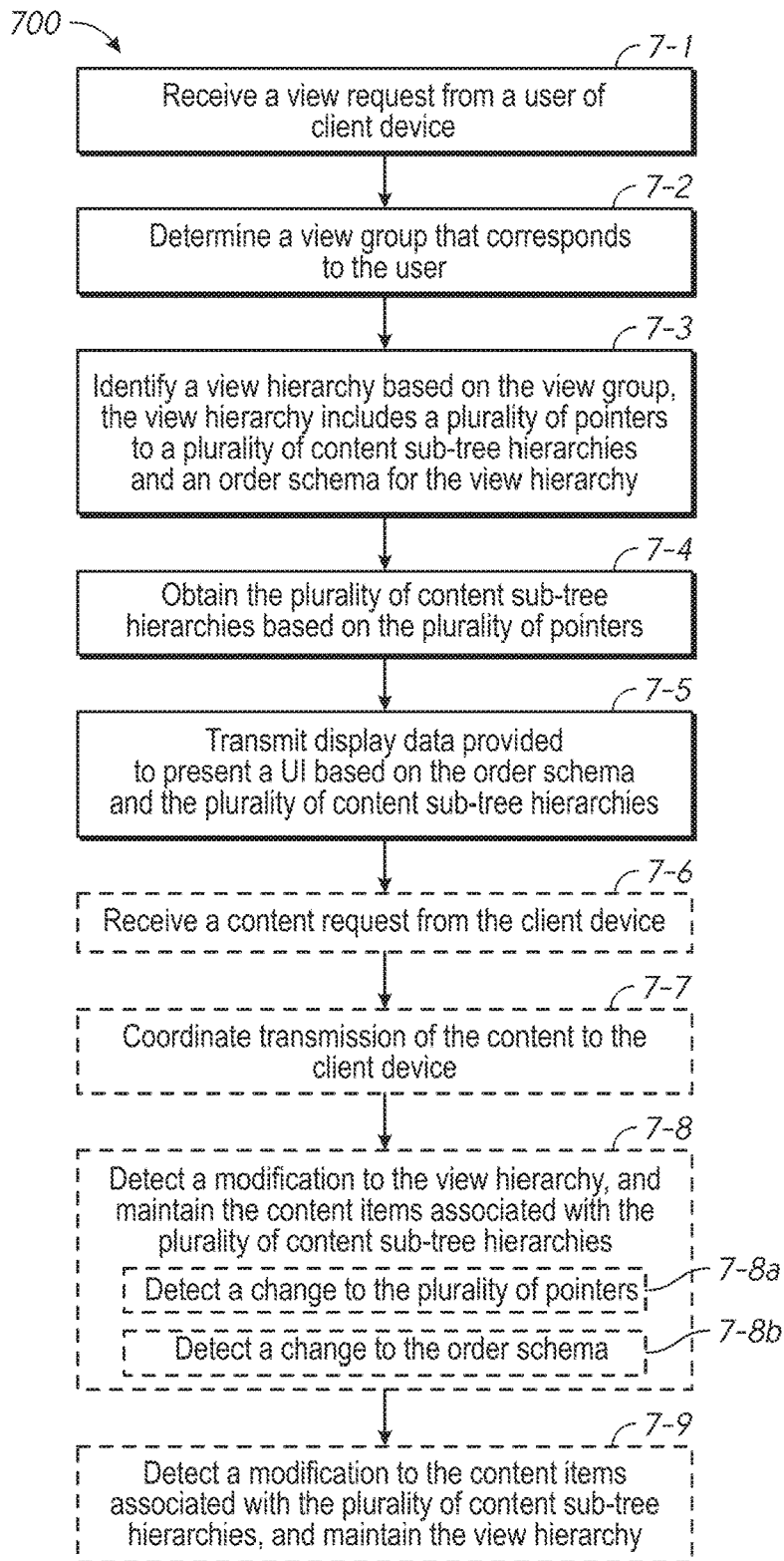
FIG. 7 is a flowchart representation of a method of providing a user interface (UI) based on a flexible hierarchy structure in accordance with some implementations.

FIG. 7 is a flowchart representation of a method 700 of providing a user interface (UI) based on a flexible hierarchy structure in accordance with some implementations. In some implementations, the method 700 is performed by a media content server or a content provider device (e.g., the content server 110, FIG. 1, or the device 800, FIG. 8). Briefly, the method 700 includes: receiving a view request from a user of a client device; determining a view group that corresponds to the user; identifying a view hierarchy based on the view group, including a plurality of pointers to a plurality of content sub-tree hierarchies and an order schema for the view hierarchy; obtaining the plurality of content sub-tree hierarchies based on the plurality of pointers; and transmitting, to the client device, display data provided to present a user interface (UI) based on the order schema and the plurality of content sub-tree hierarchies.

To that end, as represented by block 7-1, the method 700 includes receiving a view request from a user of a client device. In some implementations, the content server 110 or a component thereof (e.g., the view logic 112C, FIG. 1) receives a view request from a client device. For example, the view request corresponds to an attempt by the user of the client device login to a user account associated with a media streaming service provided by the content server 110. In another example, the view request corresponds to execution of a media streaming application on the client device that is associated with a media streaming service provided by the content server 110. According to some implementations, the view request includes user information such as at least one of a login name (e.g., a user name or login handle) or a password. In some implementations, the content server 110 receives a plurality of view requests from different client devices, and the content server 110 processes the view requests in parallel. In some implementations, the content server 110 receives a plurality of view requests from different client devices, and the content server 110 serially processes the view requests.

As represented by block 7-2, the method 700 includes determining a view group that correspond to the user. In some implementations, in response to receiving the view request, the content server 110 or a component thereof (e.g., the authentication logic 112B, FIG. 1) identifies a user ID within the authentication database 120 based on the user information associated with the view request. In some implementations, after identifying the user ID, the content server 110 or a component thereof (e.g., the view logic 112C) identifies a view group for the user within the user database 122 based on the user ID. In some implementations, the view group is determined based on login credentials provided by the user of the client device, the MAC address of the client device, an IP address associated with the device, etc. In some implementations, the identified group is associated with a particular service level, combination of subscriptions, geographic region, and/or trial group.

As represented by block 7-3, the method 700 includes identifying a view hierarchy based on the view group, where the view hierarchy includes a plurality of pointers to a plurality of content sub-tree hierarchies and the view hierarchy also includes an order schema for the view hierarchy. In some implementations, the content server 110 or a component thereof (e.g., the view logic 112C, FIG. 1) identifies a view hierarchy entry within the view database 124 for a view hierarchy that corresponds to the view group determined in block 7-2. According to some implementations, the view hierarchy is associated with a plurality of pointers to a plurality of content sub-tree hierarchies. For example, with reference to FIG. 3, the view hierarchy 305 that corresponds to the standard view includes the plurality of view hierarchy sub-nodes 304 that each include one of the content sub-tree pointers 314. In this example, the view hierarchy sub-node 304A that corresponds to the catchup category includes the content sub-tree pointer 314A that points to the sports catchup content root node 322.

In some implementations, the view hierarchy is also associated with an order schema. In some implementations, the order schema corresponds to a presentation arrangement of the content items that correspond to the plurality of content sub-tree hierarchies. For example, trial group A has a first ordering schema (e.g., new movies, new TV shows, watchlist, suggested content, etc.) and trial group B has a second ordering schema (e.g., watchlist, suggested movies, new movies, AFI top 100 movies, etc.). In this example, the content provider is able to determine which ordering scheme produces the most views/interest prior to rollout of a new schema.

For example, with reference to FIG. 3, the view hierarchy 305 is associated with an order schema corresponding to the order or layout of the user interface (UI) that corresponds to the standard view. In this example, the order schema is represented by the alignment of plurality of view hierarchy sub-nodes 304 (e.g., top-to-bottom) and the parent node pointers 312. In some implementations, each of the parent node pointers 312 is assigned a monotonically increasing integer that determines the order schema. As one example, the parent node pointer 312A associated with the view hierarchy sub-node 304A is assigned the value 1 (e.g., first in the order schema), the parent node pointer 312B associated with the view hierarchy sub-node 304B is assigned the value 2, the parent node pointer 312C associated with the view hierarchy sub-node 304C is assigned the value 3, and the parent node pointer 312D associated with the view hierarchy sub-node 304D is assigned the value 4 (e.g., last in the order schema). Continuing with this example, with reference to FIG. 6A, the block diagram 600 represents a block diagram form of the order schema (e.g., left-to-right) for the view hierarchy 305 that corresponds to the standard view. Furthermore, with reference to FIG. 6B, the first GUI 650 represents a graphic form of the order schema for the view hierarchy 305 that corresponds to the standard view.

As represented by block 7-4, the method 700 includes obtaining the plurality of content sub-tree hierarchies based on the plurality of pointers. In some implementations, the content server 110 or a component thereof (e.g., the view logic 112C, FIG. 1) identifies content sub-tree entries 231 within the organization database 126 that correspond to the plurality of content sub-tree pointers associated with the view hierarchy determined in block 7-3. According to some implementations, at least two different view hierarchies link to the same content sub-tree hierarchy. As such, the same content sub-tree hierarchies are used across varying view groups. This allows for extension A/B testing and field trials without the need for duplication of data.

As represented by block 7-5, the method 700 includes transmitting, to the client device, display data provided to present a user interface (UI) based on the order schema and the plurality of content sub-tree hierarchies. In some implementations, the content server 110 or a component thereof (e.g., the view logic 112C, FIG. 1) generates display data based on the order schema and the plurality of content sub-tree hierarchies for presenting a user interface (UI) that corresponds to the view hierarchy determined in block 7-3. In some implementations, the content server 110 or a component thereof (e.g., the view logic 112C, FIG. 1) transmits, to the client device, the display data provided to present the UI that corresponds to the view hierarchy determined in block 7-3. For example, with reference to FIGS. 5 and 6B, first display data corresponds to the first GUI 650 for the standard view and the view hierarchy 305. As another example, with reference to FIGS. 5 and 6B, second display data corresponds to the second GUI 670 for the field trial view and the view hierarchy 505. According to some implementations, the UI corresponds to an electronic programming guides (EPG) that enables the user to select content items and initiate the streaming of a selected item to the client device. In some implementations, the display data content includes Hypertext Markup Language (HTML), Extensible Markup Language (XML), Cascading Style Sheets (CSS), JavaScript, and/or the like for presenting the UI corresponding to the EPG.

In some implementations, as represented by block 7-6, the method 700 includes receiving a content request from the client device. In some implementations, the content server 110 or a component thereof (e.g., the content serving logic 112D, FIG. 1) receives a content request from the client device to initiate streaming of a respective media item. For example, the content request (e.g., an HTTP GET request) includes content information such as at least one of a content name or content ID for a content item, a bit-rate for the content item, an encoding for the content item, a resolution for the content item, a format for the content item, a DRM scheme for the content item, or the like. In some implementations, the content server 110 receives a plurality of content requests from different client devices, and the content server 110 processes the content requests in parallel. In some implementations, the content server 110 receives a plurality of content requests from different client devices, and the content server 110 serially processes the content requests.

In some implementations, as represented by block 7-7, the method 700 includes coordinating transmission of the content to the client device. In some implementations, in response to receiving the content request, the content server 110 or a component thereof (e.g., the content serving logic 112D, FIG. 1) identifies a content item (or a segment thereof) from the content database 128 based on the content information associated with the content request. In some implementations, after identifying the content item, the content server 110 or a component thereof (e.g., the content serving logic 112D, FIG. 1) coordinates transmission, to the client device, of the content item (or a segment thereof).

In some implementations, as represented by block 7-8, the method 700 includes detecting a modification to the view hierarchy, and maintain the content items associated with the plurality of sub-tree hierarchies. In some implementations, the content server 110 or a component thereof (e.g., the database management logic 112E, FIG. 1) detects a modification to a view hierarchy. For example, a new view is created by adding a view group entry to the plurality of view group entries 221 in the view database 124. As another example, an existing view is modified by changing the order schema and/or the content sub-tree pointers for a view group entry among the plurality of view group entries 221 in the view database 124. As yet another example, an existing view is removed by deleting a view group entry among the plurality of view group entries 221 from the view database 124. Thus, according to some implementations, the view groups may be modified, deleted, or added without disrupting the content sub-tree hierarchies and/or the associated content items. This allows for extensive A/B testing and field trials to be performed on various view or UIs without the need for duplication of data.

According to some implementations, as represented by block 7-8a, detecting the modification to the view hierarchy includes detecting a change to the plurality of pointers associated with the view hierarchy. In some implementations, the content server 110 or a component thereof (e.g., the database management logic 112E, FIG. 1) detects a modification to sub-tree pointers for a view group entry among the plurality of view group entries 221 in the view database 124. For example, one or more of the content sub-tree pointers associated with the view hierarchy sub-nodes are redirected to different nodes. In this example, with reference to FIG. 3, the content sub-tree pointer 314D associated with the view hierarchy sub-node 304D is changed to point to a TV shows content root node of a TV shows content sub-tree (not shown). In another example, one or more of the view hierarchy sub-nodes are removed or replaced.

According to some implementations, as represented by block 7-8b, detecting the modification to the view hierarchy includes detecting a change to the order schema associated with the view hierarchy. In some implementations, the content server 110 or a component thereof (e.g., the database management logic 112E, FIG. 1) detects a modification to the order schema for a view group entry among the plurality of view group entries 221 in the view database 124. For example, the order of view hierarchy sub-nodes associated with a view group is rearranged. In this example, with reference to FIG. 3, the view hierarchy sub-node 304D associated with the movies category is moved between the view hierarchy sub-nodes 304A and 304B. In another example, the values of the parent node pointers associated with a view group are changed. In yet another example, the parent node pointers associated with a view group are redirected to point to different nodes. In this example, with reference to FIG. 3, the parent node pointer 314A associated with the view hierarchy sub-node 304A is changed to point to the movies content root node 352 (not shown).

In some implementations, as represented by block 7-9, the method 700 includes detecting a modification to the content items associated with the plurality of sub-tree hierarchies, and maintaining the view hierarchy. In some implementations, the content server 110 or a component thereof (e.g., the database management logic 112E, FIG. 1) detects a modification to a content sub-tree hierarchy and/or associated content items. For example, contents items are added, modified, or deleted from a content sub-tree hierarchies. In this example, with reference to FIG. 6B, the content item 652A is removed from the first category 610A associated with sports catchup content (e.g., due to expiration of an associated content license). In another example, content sub-nodes associated with a content sub-tree hierarchies are rearranged, added, modified, or deleted. In this example, with reference to FIG. 3, the content sub-node 344C is moved above the content sub-node 344A. For example, a business unit that maintains the respective content sub-tree hierarchy (e.g., the movies on demand group within the media streaming service provider) modifies the content associated with the respective content sub-tree hierarchy based on expired content licenses or new content licenses. Thus, according to some implementations, the content sub-tree hierarchies and/or the associated content items may be modified, deleted, or added without disrupting the view groups. Furthermore, content sub-tree hierarchies are modified without the need for duplication due to the view hierarchies linking to the content sub-tree hierarchies.

Figure 8:
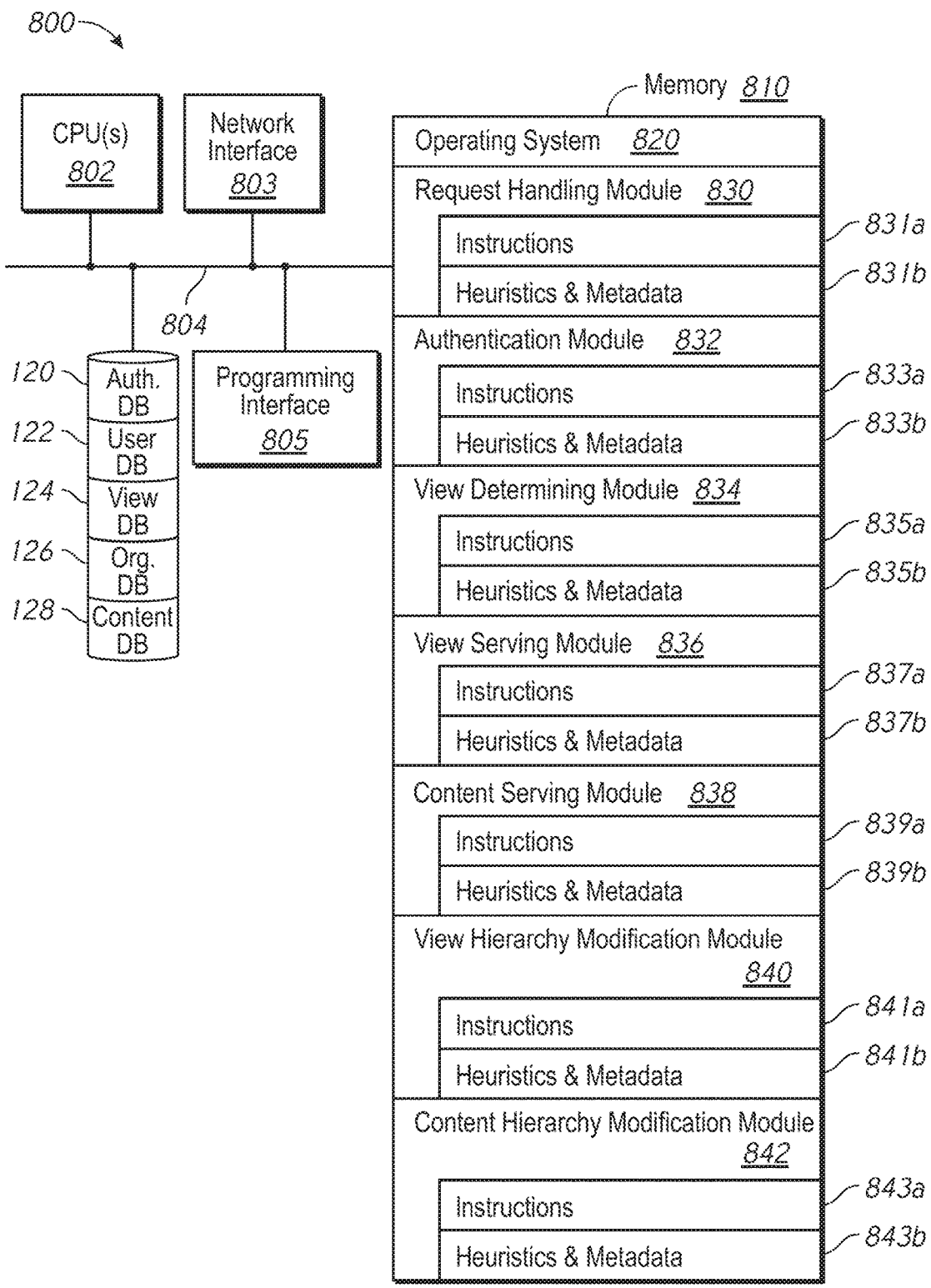
FIG. 8 is a block diagram of an example device in accordance with some implementations.

FIG. 8 is a block diagram of an example of a device 800 in accordance with some implementations. For example, in some implementations, the device 800 is similar to and adapted from the content server 110 in FIG. 1. For example, the device 800 corresponds to a media content server or a content provider device. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPUs) 802, a network interface 803 (e.g., with a network interface card (NIC), transceiver, antenna, mixer, tuner, demodulator, encoder engine, and/or the like), a memory 810, a programming (I/O) interface 805, and one or more communication buses 804 for interconnecting these and various other components.

In some implementations, the one or more communication buses 804 include circuitry that interconnects and controls communications between system components. The memory 810 includes high-speed random access memory, such as DRAM, SRAM, DDR RAM, or other random access solid state memory devices. In some implementations, the memory 810 includes non-volatile memory, such as one or more magnetic disk storage devices, optical disk storage devices, flash memory devices, or other non-volatile solid state storage devices. The memory 810 optionally includes one or more storage devices remotely located from the one or more CPUs 802. The memory 810 comprises a non-transitory computer readable storage medium. In some implementations, the memory 810 or the non-transitory computer readable storage medium of the memory 810 stores the following programs, modules and data structures, or a subset thereof including an optional operating system 820, a request handling module 830, an authentication module 832, a view determining module 834, a view serving module 836, a content serving module 838, a view hierarchy modification module 840, and a content hierarchy modification module 842.

The operating system 820 includes procedures for handling various basic system services and for performing hardware dependent tasks.

In some implementations, the request handling module 830 is configured to handle both view requests and content requests from users of client devices. To that end, in various implementations, the request handling module 830 includes instructions and/or logic 831*a*, and heuristics and metadata 831*b*.

In some implementations, the authentication module 832 is configured to, in response to a view and/or content request, authenticate the user of a client device to access the media streaming service provided by the device 800. To that end, in various implementations, the authentication module 832 includes instructions and/or logic 833*a*, and heuristics and metadata 833*b*.

In some implementations, the view determining module 834 is configured to, in response to a view request, determine a view group that corresponds to the authenticated user. To that end, in various implementations, the view determining module 834 includes instructions and/or logic 735*a*, and heuristics and metadata 735*b*.

In some implementations, the view serving module 836 is configured to identify a view hierarchy based on the view group associated with the authenticated user, including a plurality of pointers to a plurality of content sub-tree hierarchies and an order schema for the view hierarchy. In some implementations, the view serving module 836 is configured to obtain the plurality of content sub-tree hierarchies based on the plurality of pointers. In some implementations, the view serving module 836 is configured to transmit, to the client device, display data provided to present a user interface (UI) based on the order schema and the plurality of content sub-tree hierarchies. To that end, in various implementations, the view serving module 836 includes instructions and/or logic 837*a*, and heuristics and metadata 837*b*.

In some implementations, the content serving module 838 is configured to, in response to a content request, coordinate transmission of content to the client device. To that end, in various implementations, the content serving module 838 includes instructions and/or logic 839*a*, and heuristics and metadata 839*b*.

In some implementations, the view hierarchy modification module 840 is configured to coordinate modification of a view hierarchy while maintaining the integrity of the content sub-tree hierarchies and the content items thereof. To that end, in various implementations, the view hierarchy modification module 840 includes instructions and/or logic 841*a*, and heuristics and metadata 841*b*.

In some implementations, the content hierarchy modification module 842 is configured to configured to coordinate modification of a content sub-tree hierarchy or content items thereof while maintaining the integrity of the view hierarchies. To that end, in various implementations, the content hierarchy modification module 842 includes instructions and/or logic 843*a*, and heuristics and metadata 843*b*.

Although the request handling module 830, the authentication module 832, the view determining module 834, the view serving module 836, the content serving module 838, the view hierarchy modification module 840, and the content hierarchy modification module 842 are illustrated as residing on a single device (e.g., the device 800), it should be understood that in other implementations, any combination of request handling module 830, the authentication module 832, the view determining module 834, the view serving module 836, the content serving module 838, the view hierarchy modification module 840, and the content hierarchy modification module 842 reside on a separate device.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein. In another example, various portions of the disclosed methods may be practiced and/or performed in various sequences and/or combinations, including simultaneously.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a content server with one or more processors and memory:
receiving, by the content server, a first view request from a first client device;
determining, by the content server, whether the first client device is associated with a first view group or a second view group in response to receiving the first view request, wherein the first view group corresponds to a first set of content consumers that are associated with a standard view and the second view group corresponds to a second set of content consumers that are associated with a field test view; and
in response to determining whether the first client device is associated with the first view group:
identifying, by the content server, a first view hierarchy based on the first view group, wherein the first view hierarchy includes a first plurality of pointers to a first plurality of content sub-tree hierarchies associated with content items, and also including a selected first order schema of a plurality of stored order schemas corresponding to a respective plurality of presentation arrangements of content items;
obtaining, by the content server, the first plurality of content sub-tree hierarchies based on the first plurality of pointers; and
transmitting, by the content server, display data associated with a first user interface for the standard view to the first client device based on the selected first order schema and the first plurality of content sub-tree hierarchies.

2. The method of claim 1, wherein the first user interface corresponds to a first electronic programming guide (EPG).

3. The method of claim 1, wherein the selected first order schema of the plurality of stored ordered schemas indicates an ordering or layout of the content items.

4. The method of claim 1, further comprising:
detecting, by the content server, a modification to a respective content sub-tree hierarchy of the first plurality of content sub-tree hierarchies; and
maintaining, by the content server, a respective pointer of the first plurality of pointers associated with the first view hierarchy that corresponds to the respective content sub-tree hierarchy.

5. The method of claim 1, further comprising:
detecting, by the content server, a modification to the first plurality of pointers associated with the first view group; and
maintaining, by the content server, the content items associated with the first plurality of content sub-tree hierarchies.

6. The method of claim 1, further comprising:
detecting, by the content server, a modification to the selected first order schema associated with the first view hierarchy; and
maintaining, by the content server, the content items associated with the first plurality of content sub-tree hierarchies.

7. The method of claim 1, further comprising:
receiving, by the content server, a second view request from a second client device associated with a second view group; and
transmitting, by the content server, display data associated with a second user interface to the second client device based on a selected second order schema of the plurality of stored order schemas, different from the selected first order schema, and the first plurality of content sub-tree hierarchies.

8. The method of claim 1, further comprising:
receiving, by the content server, a second view request from a second client device associated with a second view group; and
transmitting, by the content server, display data associated with a second user interface to the second client device based on a selected second order schema, different from the selected first order schema, and a second plurality of content sub-tree hierarchies, different from the first plurality of content sub-tree hierarchies.

9. The method of claim 8, wherein at least some content sub-tree hierarchies in the first plurality of content sub-tree hierarchies and the second plurality of content sub-tree hierarchies are the same.

10. A content server comprising:
one or more processors;
a non-transitory memory; and
one or more programs stored in the non-transitory, which, when executed by the one or more processors, cause the content server to:
receive, by the content server, a first view request from a first client device;
determine, by the content server, whether the first client device is associated with a first view group or a second view group in response to receiving the first view request, wherein the first view group corresponds to a first set of content consumers that are associated with a standard view and the second view group corresponds to a second set of content consumers that are associated with a field test view; and
in response to determining whether the first client device is associated with the first view group:
identify, by the content server, a first view hierarchy based on the first view group, wherein the first view hierarchy includes a first plurality of pointers to a first plurality of content sub-tree hierarchies associated with content items, and first order schema of a plurality of stored order schemas corresponding to a respective plurality of presentation arrangements of content items;
obtain, by the content server, the first plurality of content sub-tree hierarchies based on the first plurality of pointers; and
transmit, by the content server, display data associated with a first user interface for the standard view to the first client device based on the selected first order schema and the first plurality of content sub-tree hierarchies.

11. The content server of claim 10, wherein the first user interface corresponds to a first electronic programming guide (EPG).

12. The content server of claim 10, wherein the one or more programs further cause the content server to:
detect, by the content server, a modification to a respective content sub-tree hierarchy of the first plurality of content sub-tree hierarchies; and
maintain, by the content server, a respective pointer of the first plurality of pointers associated with the first view hierarchy that corresponds to the respective content sub-tree hierarchy.

13. The content server of claim 10, wherein the one or more programs further cause the content server to:
- detect, by the content server, a modification to the first plurality of pointers associated with the first view group; and
- maintain, by the content server, the content items associated with the first plurality of content sub-tree hierarchies.

14. The content server of claim 10, wherein the one or more programs further cause the content server to:
- detect, by the content server, a modification to the selected first order schema associated with the first view hierarchy; and
- maintain, by the content server, the content items associated with the first plurality of content sub-tree hierarchies.

15. A non-transitory memory storing one or more programs, the one or more programs comprising instructions, which, when executed by one or more processors of a content server, cause the content server to:
- receive, by the content server, a first view request from a first client device;
- determine, by the content server, whether the first client device is associated with a first view group or a second view group in response to receiving the first view request, wherein the first view group corresponds to a first set of content consumers that are associated with a standard view and the second view group corresponds to a second set of content consumers that are associated with a field test view; and
- in response to determining whether the first client device is associated with the first view group:
  - identify, by the content server, a first view hierarchy based on the first view group, wherein the first view hierarchy includes a first plurality of pointers to a first plurality of content sub-tree hierarchies associated with content items, and also including a selected first order schema of a plurality of order schemas corresponding to a respective plurality of presentation arrangements of content items;
  - obtain, by the content server, the first plurality of content sub-tree hierarchies based on the first plurality of pointers; and
  - transmit, by the content server, display data associated with a first user interface for the standard view to the first client device based on the selected first order schema and the first plurality of content sub-tree hierarchies.

16. The non-transitory memory of claim 15, wherein the instructions further cause the content server to:
- detect, by the content server, a modification to a respective content sub-tree hierarchy of the first plurality of content sub-tree hierarchies; and
- maintain, by the content server, a respective pointer of the first plurality of pointers associated with the first view hierarchy that corresponds to the respective content sub-tree hierarchy.

17. The non-transitory memory of claim 15, wherein the instructions further cause the content server to:
- detect, by the content server, a modification to the first plurality of pointers associated with the first view group; and
- maintain, by the content server, the content items associated with the first plurality of content sub-tree hierarchies.

18. The non-transitory memory of claim 15, wherein the instructions further cause the content server to:
- detect, by the content server, a modification to the selected first order schema associated with the first view hierarchy; and maintain, by the content server, the content items associated with the first plurality of content sub-tree hierarchies.

19. The non-transitory memory of claim 15, wherein the first view group corresponds to a first set of content consumers, and wherein the first user interface corresponds to a first electronic programming guide (EPG).

20. The non-transitory memory of claim 15, wherein the selected first order schema of the plurality of stored ordered schemas indicates an ordering or layout of the content items.

* * * * *